UNITED STATES PATENT OFFICE.

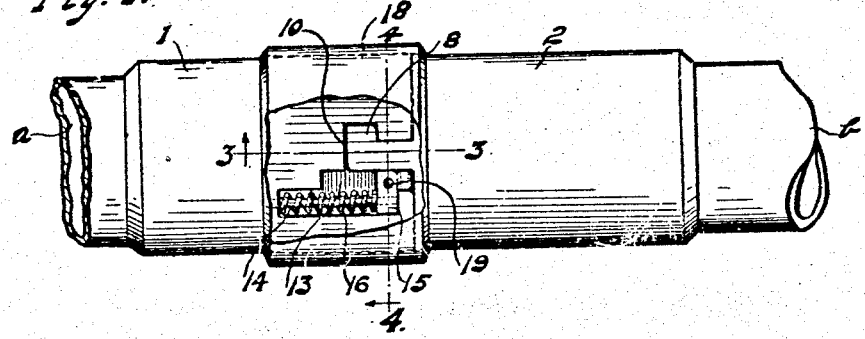
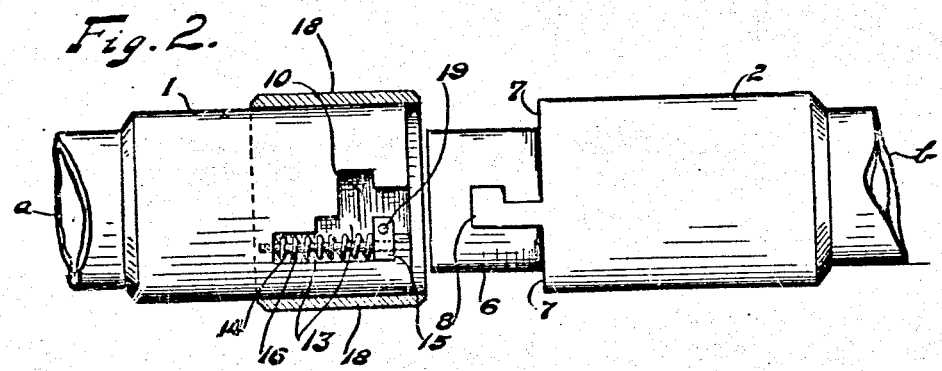
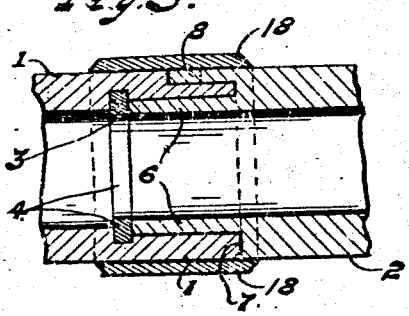
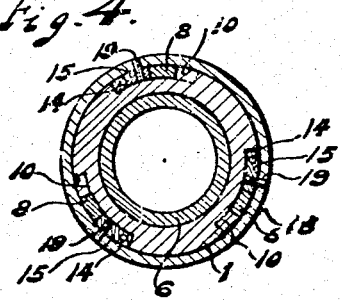

SAMUEL MEDOVÁRSKI, OF CLEVELAND, OHIO.

HOSE-COUPLING.

No. 915,885.

Specification of Letters Patent.

Patented March 23, 1909.

Application filed September 9, 1907. Serial No. 391,946.

*To all whom it may concern:*

Be it known that I, SAMUEL MEDOVÁRSKI, a subject of the Emperor of Austria-Hungary, residing at Cleveland, in the county of Cuyahoga and State of Ohio, have invented certain new and useful Improvements in Hose-Couplings; and I hereby declare the following to be a full, clear, and exact description of the invention, such as will enable others skilled in the art to which it pertains to make and use the same.

This invention relates to improvements in hose-couplings.

One object of this invention is to provide a hose-coupling, the members of which can be readily coupled and uncoupled and which will automatically lock together when in their coupled position.

A further object of my invention is to provide a device of this character which will be simple in construction, durable and positive in operation.

My invention also consists in the features of construction and combination of parts as described in the specification, pointed out in the claim and illustrated in the accompanying drawings.

In the accompanying drawings Figure 1 shows the members of the coupling locked together. Fig. 2 shows the coupling members detached. Fig. 3 is a section on line 3—3, Fig. 1. Fig. 4 is a section on line 4—4, Fig. 1.

Again referring to the drawings 1 and 2 represent the coupling members which are provided with any suitable means for securing them to the ends of the hose sections *a* and *b*. In the inner wall of the member 1 is formed a seat 3 which is provided with a packing ring 4 of any suitable material. The main or body portions of the coupling members 1 and 2 are of the same diameter, but the end of the member 2 is reduced in size, as at 6, so that it can enter the member 1 and abut against the packing 3. An annular shoulder 7 is formed on the member 2 where the reduced part joins the body portion and thereon are formed a series of L-shaped lugs 8 which project longitudinally of the coupling member and are spaced a distance away from the reduced part 6, of the member 2, so that there is a space between the lugs and the said reduced portion 6. In the outer surface of the member 1 are formed a number of L-shaped recesses 10 which correspond in number to the lugs 8 on the member 2 and said recesses are adapted to receive the said lugs 8 and by giving the members 1 and 2 a slight turn on each other the lugs will interlock with the recesses, thereby holding the members together.

Adjoining the recesses 10 in the member 1 are formed guideways 13 in each of which is mounted a rod 14. On each rod 14 is slidably arranged a small block 15 and between the block and the end of the wall of the recess is arranged a coiled spring 16 which normally holds the block near the outer end of the recess. The object of the blocks 15 is to lock the lugs 8 in the recesses 10 and the arrangement is such that when the blocks are at the outer ends of the recesses they will abut against the rear sides of the lugs and prevent any movement thereof but when the blocks are shoved back in the recesses they will clear the lugs and the lugs can be withdrawn from the recesses and the members separated. A sleeve 18 is arranged to slide on the member 1 and serves to cover the recesses in said member and prevent any foreign matter lodging therein. The blocks 15 are preferably secured to said sleeve 18 by means of pins 19 so that all the blocks can be moved back by shoving back the sleeve.

In order to couple the hose members it is only necessary to bring the ends of the lugs into registration with the mouths of the recesses, the lugs 8 will then enter the recesses shoving the blocks 15 back and when the end of the member 2 is seated in the member 1 the members are given a slight turn on each other so as to make the lugs enter completely into the recesses 10 and the blocks 15 will then spring back behind the lugs thereby locking the lugs in the recesses. To uncouple the members it is only necessary to pull back the sleeve 18 and after slightly turning the members they can be pulled apart.

What I claim is,

In a hose coupling, the combination of two members, one having a reduced portion adapted to extend into the other of said members and having an annular shoulder, L-shaped lugs extending outward from said shoulder over said reduced portion, the other of said members having recesses cut on its exterior surface forming portions adapted to interlock with the ends of said lugs when the lugs are entered in the recesses and said members are turned relatively to each other, a locking block mounted in a portion of each of said recesses and arranged to slide therein, a guiding member for each block, springs for moving said blocks forwardly so as to abut against the sides of the lugs when the latter are in locking position in the recesses, and a sleeve arranged to slide longitudinally of the member and having said blocks secured to its inner surface intermediate its ends so that said sleeve will cause said blocks to be shifted simultaneously, cover the joint between the two members and inclose the interlocking portions.

In testimony whereof I sign the foregoing specification in the presence of two witnesses.

SAMUEL MEDOVARSKI.

Witnesses:
VICTOR C. LYNCH,
ADAM MEYER.